US006453797B1

(12) United States Patent
Bauer

(10) Patent No.: US 6,453,797 B1
(45) Date of Patent: Sep. 24, 2002

(54) PISTON FOR AN INTERNAL COMBUSTION ENGINE

(75) Inventor: Valery Bauer, Waiblingen (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 09/807,044

(22) PCT Filed: Aug. 26, 1999

(86) PCT No.: PCT/DE99/02751

§ 371 (c)(1), (2), (4) Date: Apr. 6, 2001

(87) PCT Pub. No.: WO00/22289

PCT Pub. Date: Apr. 20, 2000

(30) Foreign Application Priority Data

Oct. 9, 1998 (DE) ........................................ 198 46 496

(51) Int. Cl.[7] ............................ F01B 31/08; F16J 1/04; F02F 3/00

(52) U.S. Cl. ......................... 92/186; 92/220; 123/193.6

(58) Field of Search .......................... 92/186, 216, 220, 92/255, 256; 123/193.6

(56) References Cited

U.S. PATENT DOCUMENTS 1,089,823 A * 3/1914 Day et al. ............ 123/193.6 X
2,214,891 A * 9/1940 Schrom ....................... 92/220
3,187,643 A * 6/1965 Pope .................. 123/193.6 X
3,805,677 A * 4/1974 Clary et al. .................... 92/186
4,506,632 A 3/1985 Kanda et al. ............. 92/186 X
5,052,280 A * 10/1991 Kopf et al. .................... 92/186
6,026,777 A * 2/2000 Kennitz et al. .......... 123/193.6

FOREIGN PATENT DOCUMENTS

DE 1040842 10/1958
EP 0237853 2/1987
GB 491843 9/1938
GB 1058360 2/1967
GB 2261717 5/1993
JP 60-125338 8/1985

* cited by examiner

*Primary Examiner*—John E. Ryznic
(74) *Attorney, Agent, or Firm*—Collard & Roe, P.C.

(57) ABSTRACT

A piston for an internal combustion engine, comprising a piston head (2) and at least one cooling chamber (4) that can be supplied with oil and is arranged underneath the head (2) of the piston, whereby the lower limit of the cooling chamber is formed by a sheet of metal that can be elastically deformed and is fixed to the piston. The objective of the invention is to enable the metal sheet (6) to be fixed in a simple manner. This is achieved by using components that are subjected to pressure, pressing the elastically deformable sheet of metal (6) against projections that are located at a height corresponding to approximately half way up the hub supports in the direction of the piston head (2).

3 Claims, 5 Drawing Sheets

PISTON FOR AN INTERNAL COMBUSTION ENGINE

CROSS REFERENCE TO RELATED APPLICATIONS

Applicants claim priority under 35 U.S.C. §119 of German Application No. 198 46 496.7, filed Oct. 9, 1998. Applicants also claim priority under 35 U.S.C. §120 of PCT/DE99/02751, filed Aug. 26, 1999. The international application under PCT article 21(2) was not published in English.

The invention relates to a piston for an internal combustion engine according to the introductory part of claim 1. Such a piston is known, for example from JP utility patent 60-125338, where the sheet of metal forming the lower limitation of a cooling chamber is elastically supported on the inner bosses by means of molded-on tabs. Such a fastening of the sheet of metal requires a complicated shaping of the sheet of metal.

The invention, therefore, deals with the problem of achieving in conjunction with a piston for an internal combustion engine of the type specified above the fixing of the sheet of metal in a simple manner and without complicated shaping of the sheet of metal.

Said problem is solved with pistons of the type specified above by the characterizing features of claim 1, whereby the sheet of metal is pressed down by the pressure-loaded means in the axial direction, away from the piston head. Advantageous further developments are the objects of the dependent claims.

By bracing the sheet of metal against the piston with the help of a pressure-loaded screw or a threaded pin, a very simple possibility is created for fixing the elastically deformable sheet of metal. The threaded pin can be turned in this conjunction via a hollow screw or splines or a slot. Instead of using a screw or a threaded pin it is possible also to employ a pressure piece which, in conjunction with an initially tensioned sheet of metal is pushed through an opening of the latter with the help of a device, and which largely maintains the initial tension of the sheet of metal after the device has been removed.

The invention is explained in greater detail in the following with the help of an exemplified embodiment. In the drawing, FIG. 1 shows a cross section of a piston as defined by the invention, with the left side cut in the direction of the pin and the right side cut in the pressure-counterpressure direction.

Figure 1:
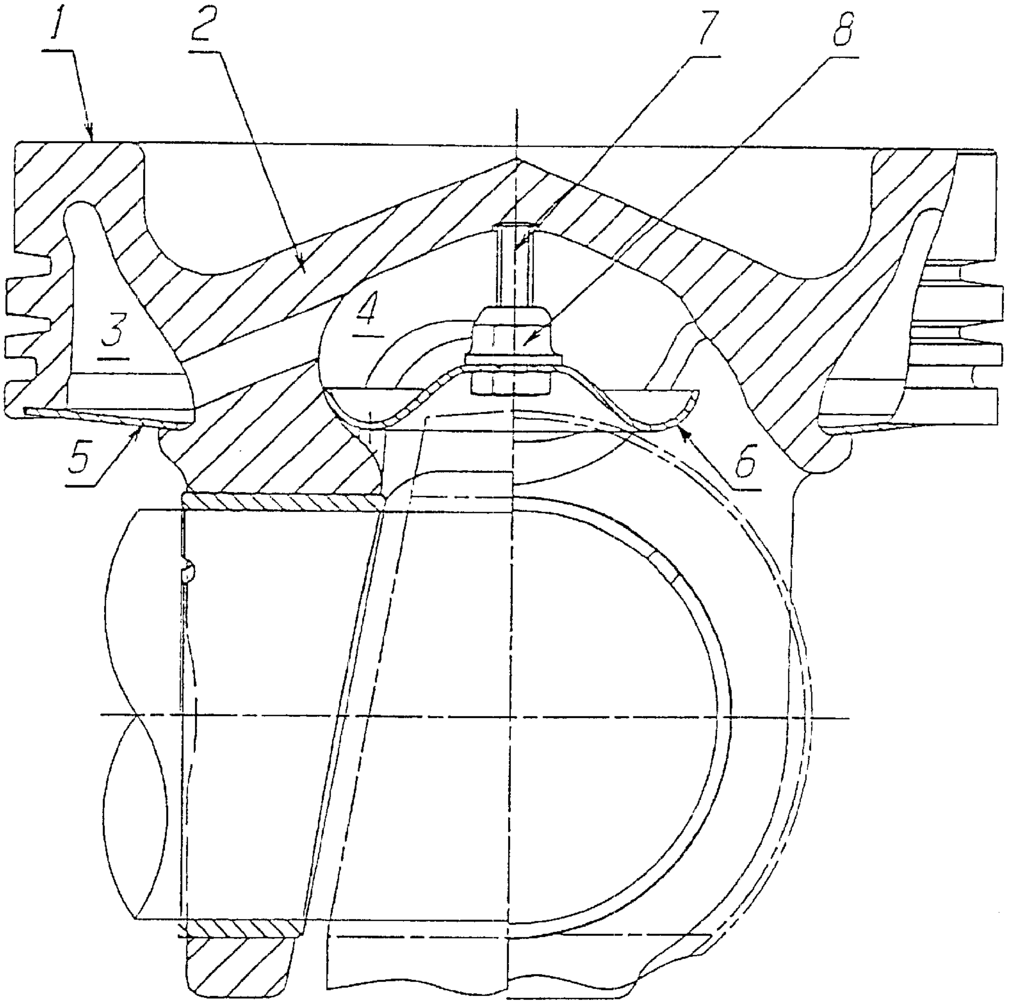

A piston top part 1 of a pendulum shaft piston has a piston head 2 and underneath the latter an external cooling channel 3 and an internal cooling chamber 4. The cooling channel 3 and the cooling chamber 4 each are limited downwards by a metal sheet 5 and 6, respectively. According to the invention, the metal sheet 6 is fixed on the top part 1 of the piston in that the metal sheet is pressed down by a pressure screw 7 supported on the piston head 2 and in this way braced against supports present on the piston top part 1. A nut 8 is connected with the metal sheet, for example by pressure welding; the pressure screw 7 is screwed into said nut.

Figure 2:
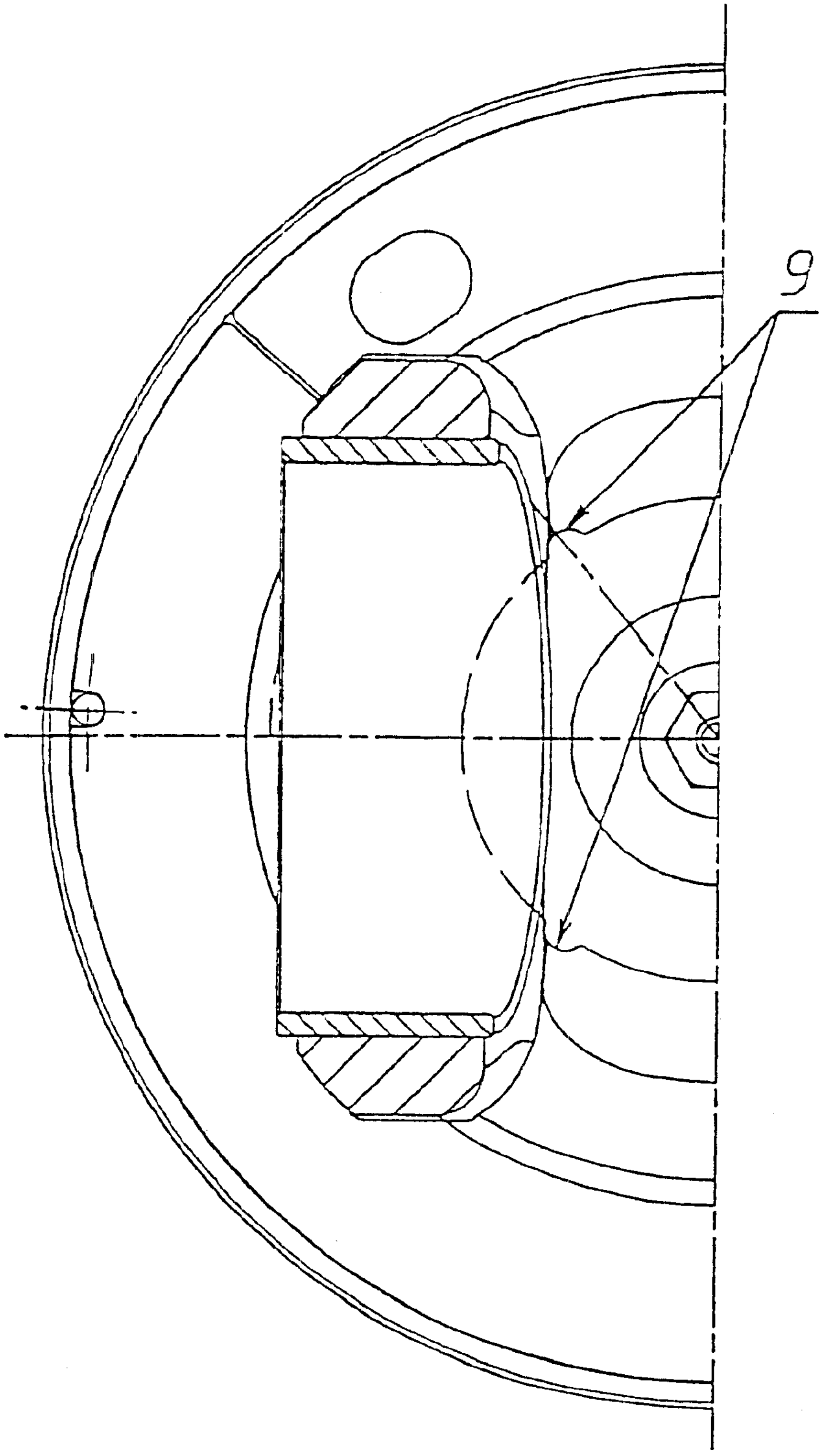
FIG. 2 shows a piston as defined by the invention from the bottom.

FIG. 2 shows that the metal sheet 6 is secured against turning by molded-on noses that run up on the boss support of the piston.

During assembly, the metal sheet 6 is first exactly positioned in the piston and the metal sheet is subsequently elastically deformed and initially tensioned by turning the screw 7 as soon as the latter supports itself on the piston head 2.

Figure 3:
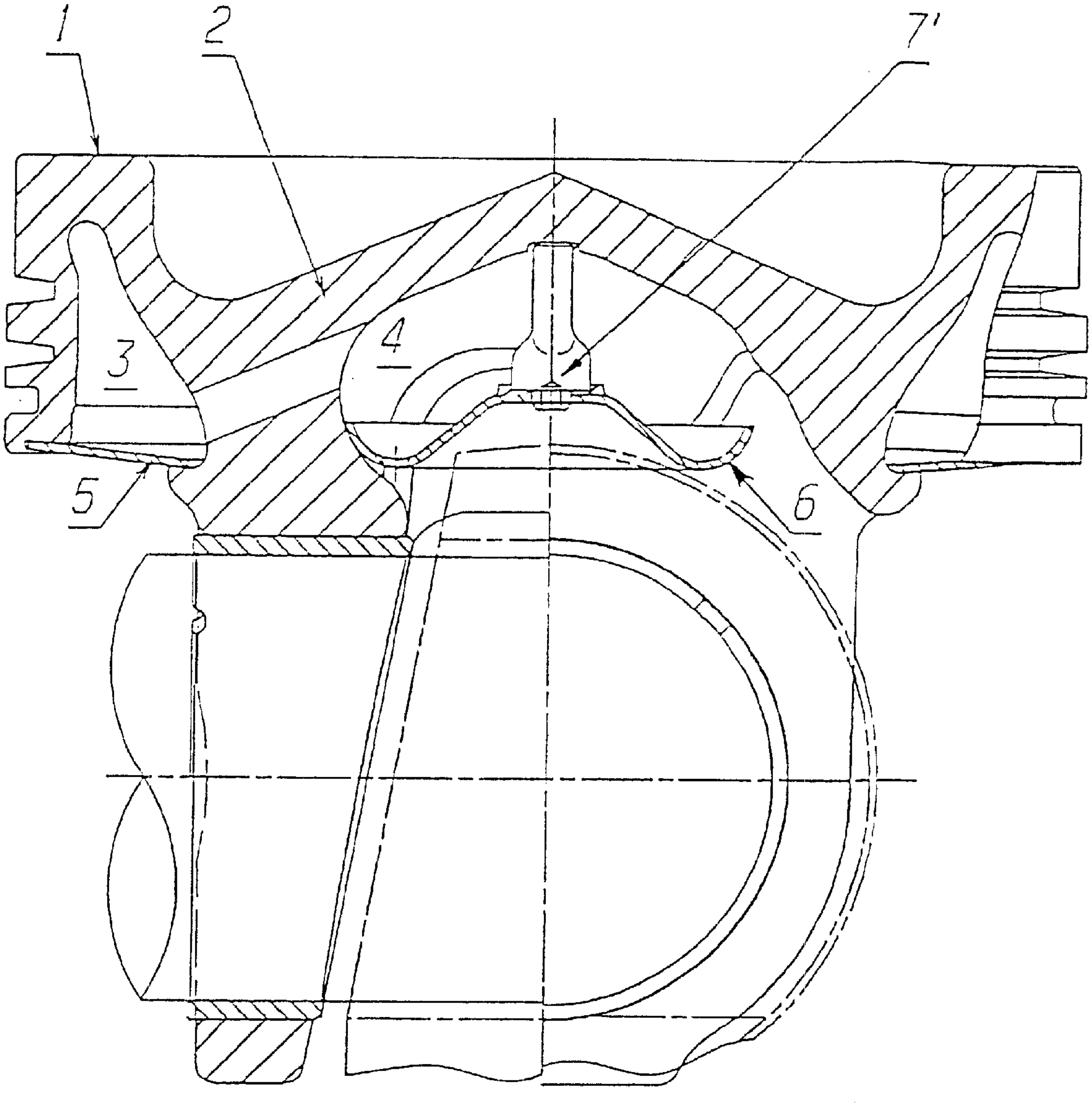
FIG. 3 shows another embodiment of the piston as defined by the invention.
Figure 4:
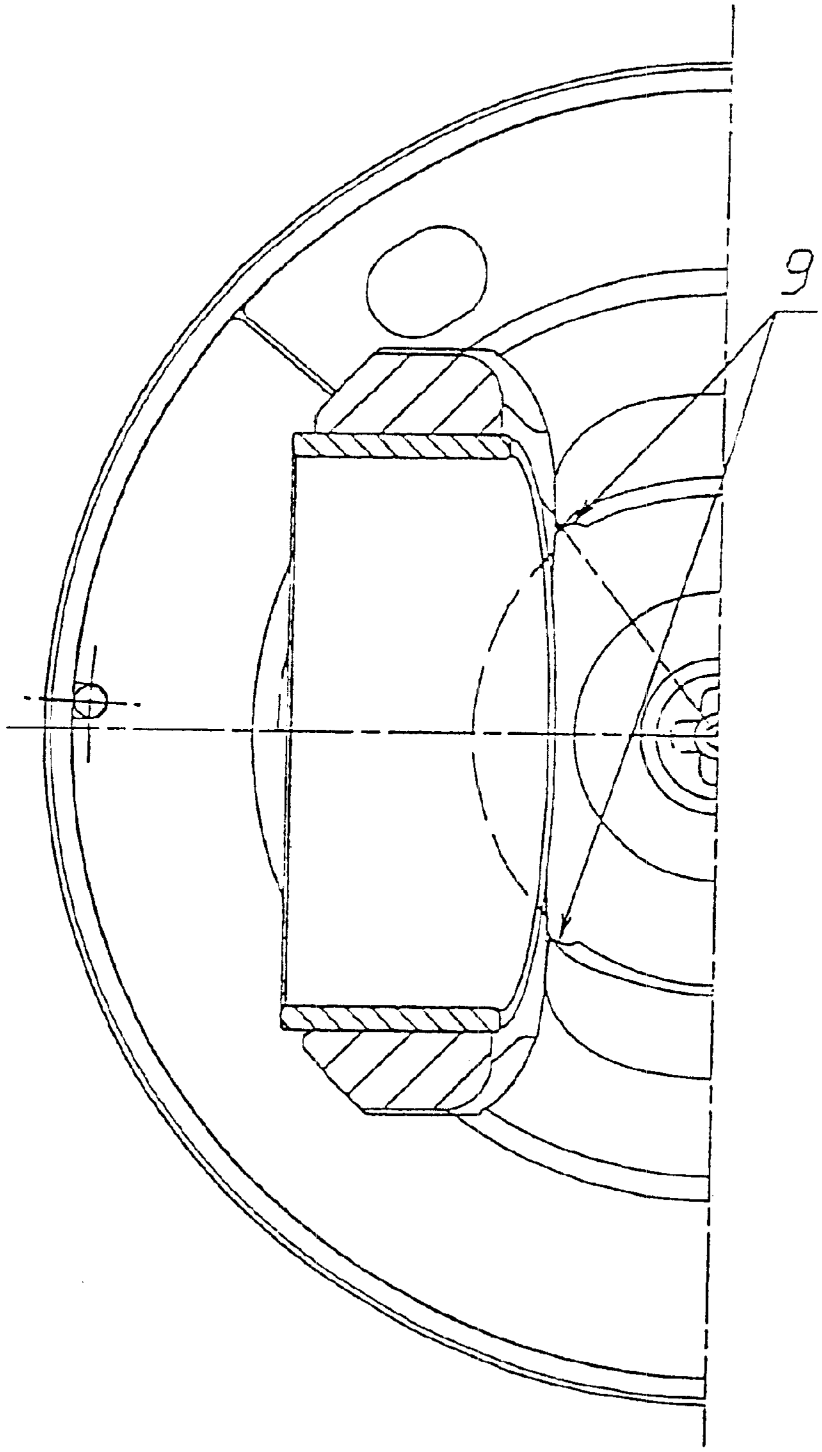
FIG. 4 shows the piston according to FIG. 3 by a view from below.

With the embodiment according to FIGS. 3 and 4, the metal sheet is braced against the piston head not by tightening a screw or a threaded pin, but the metal sheet is initially tensioned with the help of a clamping device and the pressure piece 7' is subsequently pushed through an opening present in the metal sheet and then turned by 90°. Means are present in this conjunction, in particular wider openings, which permit the clamping device to engage the metal sheet.

In its upper zone, the pressure piece 7' has around cross section; it is narrow and oblong in its lower zone, so that it is overall similar to a screwdriver bit. An opening for receiving the pressure piece 7' is centrically provided in the metal sheet; the contour of said opening permits both the round cross section and the narrow, oblong cross section to be pushed through. By turning the pressure piece by 90°—this position is indicated in FIG. 4 by dashed line—and subsequently removing the clamping device, the pressure piece assumes the initial tensioning of the elastic sheet metal.

Figure 5:
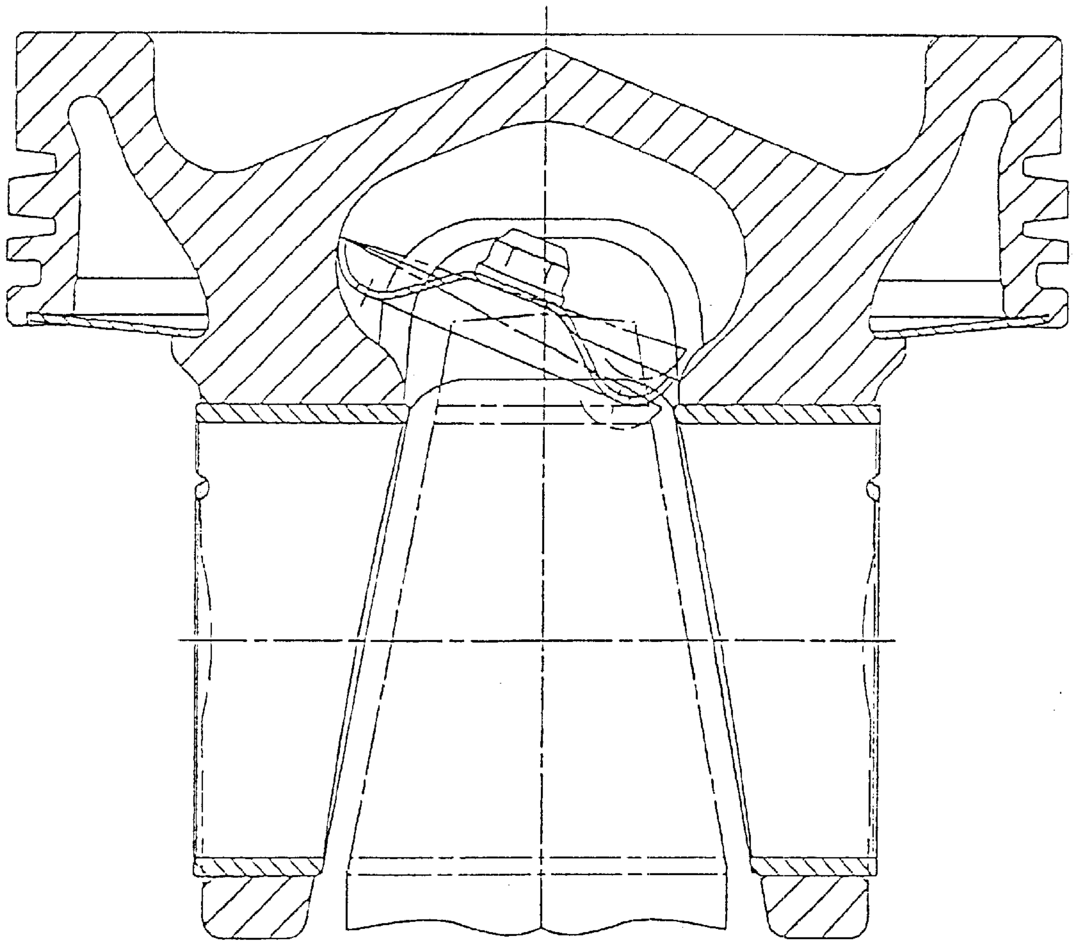
FIG. 5 shows the installation of the piston in the internal cooling chamber of the piston.

FIG. 5 shows that the metal sheet can be positioned in the internal cooling chamber by a tilting movement.

What is claimed is:

1. A piston for an internal combustion engine, comprising:

a piston head;

at least one cooling chamber arranged underneath said piston head;

an elastically deformable metal sheet fixed on the piston wherein said piston head forms an upper limitation of said cooling chamber and said metal sheet forts a lower limitation of said cooling chamber;

at least one threaded nut fixed on said metal sheet;

pressure-loaded means comprising one of a screw or threaded pin screwed into said nut, said pressure loaded means having an end that presses against the piston head, wherein said pressure-loaded means presses said metal sheet downwards against projections molded onto the piston, and in this way braces the metal sheet against the piston.

2. The piston according to claim 1, wherein the metal sheet has an opening for receiving the pressure loaded means.

3. A piston for an internal combustion engine, comprising:

a piston head;

at least one cooling chamber arranged underneath said piston head;

an elastically deformable metal sheet fixed on the piston wherein said piston head forms an upper limitation of said cooling chamber and said metal sheet forms a lower limitation of said cooling chamber;

means for initially tensioning the metal sheet via a clamping device;

wherein the metal sheet has an opening for pushing a pressure piece through in a direction of the piston head; and wherein the pressure piece, after having been pushed through, is turned into a position in which said the pressure piece braces the metal sheet against the piston head after the clamping device has been removed.

* * * * *